Patented May 3, 1949

2,468,975

UNITED STATES PATENT OFFICE 2,468,975

PLASTIC COMPOSITION COMPRISING VINYL RESIN AND DICARBONATE ESTER

Fred J. Held, Jr., and Robert P. Blaine, Cleveland, Ohio, assignors to The B. F. Goodrich Company, New York, N. Y., a corporation of New York No Drawing. Application August 24, 1946, Serial No. 692,932

11 Claims. (Cl. 260—29.1)

This invention relates to new plastic compositions and pertains more specifically to compositions having as a base certain vinyl resins such as the polymers and copolymers of vinyl chloride or vinylidene chloride.

The polymers and copolymers of vinyl chloride and vinylidene chloride have found wide application in the field of synthetic thermoplastic materials. One of the factors which has led to the wide acceptance of these materials is the fact that the physical properties of the compositions, such as hardness, resiliency, etc. may be varied at well over a wide range by varying the relative proportions of the various ingredients in such compositions. However, one of the problems in manufacture of such compositions has been to provide a composition which is hard at ordinary temperatures but which is soft enough at elevated temperatures so that it may readily be processed. A wide variety of plasticizers or softening agents has been proposed for use with these polymers. However, with the plasticizers previously known, if enough plasticizer is added to render the composition capable of being processed, as by molding, calendering, or extruding, at temperatures below those at which the polymer present begins to decompose, the composition is relatively soft at room temperature. On the other hand, if the plasticizer content is reduced in order to increase the hardness of the composition at ordinary temperatures, the composition can be processed only at very high temperatures and pressures, under which conditions decomposition of the polymer is extremely difficult to avoid.

We have now discovered that compositions comprising such polymers together with aliphatic diesters of 4,4'-dicarbonatodiphenyl alkanes combine to a remarkable extent the desired properties of high hardness at ordinary temperatures with ready processability at the usual processing temperatures.

The polymers which may serve as a base for such compositions include polymers of monomeric materials comprising predominantly (i. e. containing over 50% by weight of) a chloroethylene having from one to two chlorine atoms on one only of the carbon atoms; among such monomeric materials are vinyl chloride vinylidene chloride, mixtures of these two with each other, and mixtures of one or both with lesser proportions of one or more other copolymerizable monomers containing a single olefinic double bond, such as vinyl acetate, vinyl propionate, vinyl butyrate, vinyl chloroacetate, methyl acrylate, ethyl acrylate, methyl methacrylate, methyl ethacrylate, ethyl methacrylate, methyl alphachloracrylate, methyl vinyl ketone, acrylonitrile, maleic acid or anhydride, esters of maleic acid or of chloromaleic acid, and the like.

Any aliphatic diesters of 4,4'-dicarbonatodiphenyl alkanes may be used but it is preferred to employ compounds in which both phenyl groups are directly attached to the same carbon atom of the alkane, particularly those in which the aliphatic portions of the ester contain only carbon and hydrogen. Although any substituent groups may be attached to the benzene ring, such as alkyl, alkoxy, hydroxy, nitro, halogen, acetoxy, etc., it is preferred to employ compounds which contain no substituent groups except halogen. Particularly preferred are the nuclear-halogenated 4,4'-bis-(alkylcarbonato) diphenyl alkanes in which both phenyl groups are directly attached to the same carbon atom in the alkane, and the similar nuclear halogenated 4,4'-bis-(alkenylcarbonato) diphenyl alkanes.

These compounds may be prepared by reacting a bis-phenol with two molecular proportions of an aliphatic chloroformate. It is preferred to carry out the reaction in the presence of a basic material such as sodium hydroxide, potassium hydroxide, sodium carbonate, pyridine, quinoline, or the like which serves to neutralize the hydrogen chloride eliminated during the reaction. The general reaction may be represented by the equation:

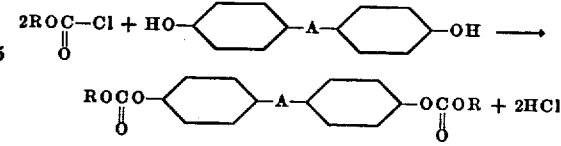

where R is an aliphatic group and A is a bivalent aliphatic hydrocarbon group. Among the chloroformates which may be used are methyl chloroformate, ethyl chloroformate, n-propyl chloroformate, n-butyl chloroformate, n-hexyl chloroformate, vinyl chloroformate, allyl chloroformate, methallyl chloroformate, and the like. These and other similar chloroformates may be prepared by reacting phosgene with the appropriate alcohol, preferably in the presence of an alkaline material. The bis-phenols which may be used include bis-(4-hydroxyphenyl) methane; 2,2-bis-(4-hydroxyphenyl) propane; 2,2-bis-(4-hydroxyphenyl) butane; 2,2-bis-(4-hydroxyphenyl)-4-methyl pentane; 2,2-bis-(3-methyl-4-hydroxyphenyl) propane; 2,2-bis-(3-phenyl-4-hydroxyphenyl) propane; 1,1-bis-(4-hydroxyphenyl) heptane; 2,2 - bis-(4-hydroxyphenyl) heptane; 4,4 - bis-(4 - hydroxyphenyl)-heptane; 1,1-bis-(4-hydroxyphenyl) propene-1; 1,13-bis-(4-hydroxyphenyl) tridecane; 2,12-bis-(4-hydroxyphenyl) tridecane; 1,10 - bis - (4 - hydroxyphenyl) octadecane, and the like.

If it is desired to employ a nuclear chlorinated dicarbonate ester in the polymer composition, the chlorine, bromine, iodine, or fluorine may be introduced into the bis-phenol before the latter is reacted with the chloroformate, or it may be introduced into the dicarbonate ester itself. The halogenation may be accomplished by dissolving or suspending the bis-phenol or dicarbonate in an inert medium such as glacial acetic acid and stirring the desired amount of halogen into the mixture at room temperature.

The polymer compositions of this invention are prepared by admixing a polymer or copolymer of vinyl or vinylidene chloride with an aliphatic diester of a 4,4-dicarbonatodiphenyl alkane in any desired manner and in any desired proportions. For example, the diester may be added to the polymeric material on a roll mill, or in an internal mixer or the like, or a solution of the diester in a solvent may be added to a solution of the polymeric material to form a solution or cement of the plastic composition, or the diester may be added as such or in solution to an aqueous dispersion or latex of the polymeric material. For most purposes, as when the composition is to be used in the preparation of molded or extruded articles, the proportion of diester employed is less than that of the polymeric material, particularly valuable compositions being obtained when from about 5 to 100 parts of diester are admixed with 100 parts of polymeric material. For other purposes, however, as when the composition is to be used in the form of a gel or paste or an aqueous dispersion, it is often desirable to employ softer compositions containing as much as 100 to 500 parts of diester to each 100 parts of polymer.

There may be added to the composition other ingredients such as fillers, pigments, reinforcing agents, dyes, stabilizers, softeners, and the like which are commonly used in the rubber and plastics industry. Other natural or synthetic resins or rubbers may also be added; particularly valuable, it has been found, are compositions comprising a chloroethylene polymer or copolymer, a dicarbonate diester, as described hereinabove, and in addition a copolymer of a butadiene-1,3 hydrocarbon such as butadiene-1,3, isoprene, 2,3-dimethyl butadiene-1,3 or the like with an acrylic nitrile such as acrylonitrile and its homologs such as methacrylonitrile and ethacrylonitrile; alphachloro acrylonitrile, etc. preferably a copolymer of butadiene-1,3 with acrylonitrile. Such a copolymer may be prepared by any of the known methods of preparing copolymers, although it has been found that copolymers prepared by emulsion polymerization of a mixture of butadiene-1,3 with a lesser amount of acrylonitrile give best results. The copolymer may be admixed with the diester and the chloroethylene polymer or copolymer on a mill or by any of the other methods mentioned above and in any desired proportions. Compositions comprising from as little as 5 to as much as 500 parts of butadiene acrylonitrile copolymer for each 100 parts of chloroethylene polymer are all quite useful, compositions containing from 25 to 100 parts of butadiene-1,3 copolymer to 100 parts of the chloroethylene polymer being particularly useful as patent leather substitutes. Compositions containing the butadiene copolymer may be admixed with vulcanizing ingredients such as sulfur and accelerators and the copolymer vulcanized if desired.

The following examples are intended solely as illustrations of the invention and not as limitations upon its scope.

Example I

A solution of 136.8 parts by weight of 2,2-bis-(4-hydroxyphenyl) propane and 172.2 parts of n-butyl chloroformate in 215 parts of ethyl ether was prepared. To this solution there was added gradually, with constant stirring, a solution of 55 parts of sodium hydroxide in 300 parts of water while maintaining the temperature of the reaction mixture at about 5° to 10° C. After completion of the reaction the ether layer, containing the product, was separated from the aqueous layer, washed with a 2% aqueous sodium hydroxide solution and with water, and dried over sodium sulfate. The ether was removed by heating the solution to 100° C. at reduced pressure. The product, 2,2-bis-(4-n-butylcarbonatophenyl) propane, was in the form of an oily liquid.

A homogeneous mixture of 150 parts by weight of high molecular weight polyvinyl chloride with 100 parts by weight of the above-described product was prepared on a hot roll mill. It was found that the materials could readily be blended together at a roll temperature of 260° to 265° F. and that the composition was clear and hard at room temperature. Upon heating for 115 hours at 90° C. the composition suffered a loss in weight of only 0.2% and exhibited no signs of "bleeding." It was eminently suitable for the manufacture of phonograph records and other molded goods.

Example II 2,2-bis-(3-chloro-4-hydroxyphenyl) propane was prepared by bubbling chlorine into a solution of 2,2-bis-(4-hydroxyphenyl) propane in glacial acetic acid at room temperature. About 178.4 parts by weight of the product were then reacted with 172.2 parts of n-butyl chloroformate under the same conditions as described in Example I.

The product, 2,2-bis-(3-chloro-4-n-butylcarbonatophenyl) propane, an oily liquid, was mixed with high molecular weight polyvinyl chloride in the proportion of 2 parts of liquid to 3 parts of polymer. It was found that homogeneous mixing was readily effected on a roll mill at a temperature of about 255° to 260° F. The composition was similar in properties to that of Example I.

Example III 2,2-bis-(3-chloro-4-n - hexylcarbonatophenyl) propane was prepared by reacting 59.4 parts by weight of 2,2-bis-(3-chloro-4-hydroxyphenyl) propane with 69.1 parts of n-hexyl chloroformate in 71 parts of ether, in the same manner as described in Example I, using 18.4 parts of sodium hydroxide dissolved in 100 parts of water.

The product, an oily liquid, was mixed with high molecular weight polyvinyl chloride to form a homogeneous composition in the proportion of 2 parts of liquid to 3 parts of polymer on a roll mill at a temperature of 275–280° F. The composition was similar in properties to those of the preceding examples.

Example IV 2,2-bis-(3-chloro-4-allylcarbonatophenyl) propane was prepared by reacting 180 parts by weight of 2,2-bis-(3-chloro-4-hydroxyphenyl)

propane with 151 parts of allyl chloroformate in the same manner as described in Example I. The product was mixed with high molecular weight polyvinyl chloride in varying proportions to form homogeneous compositions. The temperature required to form homogeneous blends on a roll mill was about 280° F. The proportions used were 5, 10, 20, and 33.3 parts by weight of the dicarbonate ester for each 100 parts of polyvinyl chloride. Surprisingly enough, the hardness of the compositions remained substantially constant throughout this range of proportions.

If a very large proportion of the dicarbonate ester is employed, for example 500 parts for 100 parts of polyvinyl chloride, the resulting composition is a very soft gel. Such a composition may be prepared merely by stirring the two components together while heating them to an elevated temperature, without the use of a roll mill.

When the above examples are repeated using other chloroethylene polymers and copolymers, such as polyvinylidene chloride, vinyl chloride vinylidene chloride copolymers, vinyl chloride methyl acrylate copolymers, etc., in place of polyvinyl chloride and using various other dicarbonate esters of the formula

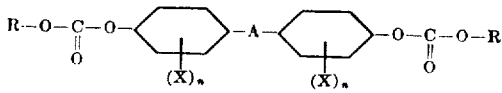

wherein R is an aliphatic hydrocarbon radical such as an alkyl or alkenyl group; X is halogen; $n$ is a numeral having a value of 0 to 4 and A is an alkylidene radical, in place of the specific diesters illustrated, compositions are obtained which are substantially equivalent to those described in the examples.

All of these compositions differ from polymer compositions containing ordinary liquid plasticizers, such as tricresyl phosphate, dibutyl phthalate, or the like, in that they exhibit no signs of "bleeding" (exudation of droplets of liquid on the surface of the composition) even when the composition contains as much as 85% by weight of the dicarbonate ester. Moreover, the compositions may be placed in contact with varnished or shellacked surfaces with no deleterious effect upon the latter. In addition, the dicarbonate esters appear to have a stabilizing effect upon the polyvinyl chloride inasmuch as no decomposition of the polymer was observed even when the compositions were milled at high temperatures for considerable lengths of time. The compositions thus prepared have an extremely high surface luster, in striking comparison with the relatively low luster obtained with compositions containing similar polymers or copolymers and any of the usual liquid plasticizers.

*Example V*

A blend was prepared by milling on a warm mill 40 parts by weight of a copolymer made by polymerizing 67% by weight of butadiene-1,3 with 33% of acrylonitrile and adding to it 100 parts by weight of powdered high molecular weight polyvinyl chloride and 17 parts of channel black. To this composition there were added on the mill at 280° F. approximately 33.3 parts of 2,2-bis-(3-chloro-4-allylcarbonatophenyl) propane. The resulting homogeneous composition could readily be molded at 300° to 320° F., the usual molding temperature for polyvinyl chloride compositions, and could be calendered into sheets at roll temperatures as low as 220° to 230° F. with practically none of the creping effect usually obtained in calendering butadiene-acrylonitrile copolymers at these temperatures. The composition is flexible at low temperatures, and possesses an extremely high surface luster with no surface tack, both of which properties render it an unusually valuable substitute for patent leather.

Similar compositions are secured when other chloroethylene polymers and other dicarbonate esters of the character hereinabove described are incorporated with a butadiene-1,3 acrylonitrile copolymer.

Numerous modifications and variations in the invention will be apparent to those skilled in the art and hence it is not intended that the invention be limited except by the spirit and scope of the appended claims.

We claim:
1. A plastic composition comprising a polymer of a monomeric material comprising predominantly vinyl chloride and from 5 to 100% by weight based on said polymer of a 4,4'-bis-alkylcarbonato (diphenyl alkane) in which both phenyl groups are directly attached to the same carbon atom in the alkane.

2. A plastic composition comprising polyvinyl chloride and from 5 to 100% by weight based on the polyvinyl chloride of 2,2-bis (4-n-butylcarbonato-phenyl) propane.

3. A plastic composition comprising polyvinyl chloride and from 5 to 100% by weight based on the polyvinyl chloride of a 4,4'-bis (alkenylcarbonato) diphenyl alkane in which both the phenyl groups are directly attached to the same carbon atom in the alkane.

4. A plastic composition comprising polyvinyl chloride and from 5 to 100% by weight based on the polyvinyl chloride of a nuclear halogenated 4,4'-bis-(alkenylcarbonato) diphenyl alkane in which both phenyl groups are directly attached to the same carbon atom in the alkane.

5. A plastic composition comprising polyvinyl chloride and from 5 to 100% by weight based on the polyvinyl chloride of 4,4'-bis-(allylcarbonato) diphenyl propane.

6. A plastic composition comprising polyvinyl chloride and from 5 to 100% by weight based on the polyvinyl chloride of 2,2'-bis-(3-chloro-4-allylcarbonato-phenyl) propane.

7. A plastic composition comprising polyvinyl chloride, from 5 to 100% by weight based on the polyvinyl chloride of 2,2-bis-(3-chloro-4-allylcarbonato-phenyl) propane and from 25 to 100% by weight based on the polyvinyl chloride of a copolymer of butadiene-1,3 and acrylonitrile.

8. A plastic composition comprising polyvinyl chloride, from 5 to 100% by weight based on the polyvinyl chloride of a nuclear halogenated 4,4'-bis-(alkenyl carbonato) diphenyl alkane in which both phenyl groups are directly attached to the same carbon atom in the alkane and from 25 to 100% by weight based on the polyvinyl chloride of a copolymer of a butadiene-1,3 hydrocarbon and acrylonitrile.

9. A plastic composition comprising a polymer of a monomeric material comprising predominantly vinyl chloride, from 25 to 100% by weight based on said polymer of a copolymer of a butadiene-1,3 hydrocarbon and acrylonitrile, and from 5 to 100% by weight based on said polymer of an ester of the formula

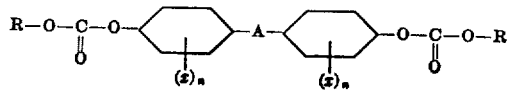

wherein R is an aliphatic hydrocarbon radical selected from the class consisting of alkyl and alkenyl radicals, $x$ is halogen, $n$ is a numeral having a value of 0 to 4 and A is an alkylidene radical.

10. A plastic composition comprising a polymer of a monomeric material comprising predominantly a chloroethylene having from 1 to 2 chlorine atoms on one only of the carbon atoms and having the carbon atoms otherwise attached only to hydrogen, from 5 to 100% by weight based on said polymer of a copolymer of a butadiene-1,3 hydrocarbon and acrylonitrile, and from 5 to 500% by weight based on said polymer of an ester of the formula

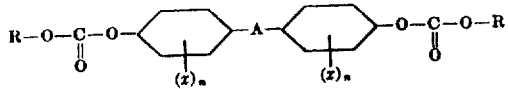

wherein R is an aliphatic hydrocarbon radical selected from the class consisting of alkyl and alkenyl radicals, $x$ is halogen, $n$ is a numeral having a value of 0 to 4 and A is an alkylidene radical.

11. A plastic composition comprising a polymer of a monomeric material comprising predominantly a chloroethylene having from 1 to 2 chlorine atoms on one only of the carbon atoms and having the carbon atoms otherwise attached only to hydrogen, and from 5 to 500% by weight based on said polymer of an ester of the formula

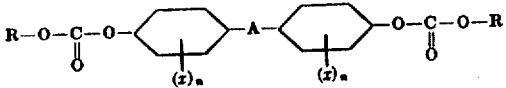

wherein R is an aliphatic hydrocarbon radical selected from the class consisting of alkyl and alkenyl radicals, $x$ is halogen, $n$ is a numeral having a value of 0 to 4 and A is an alkylidene radical.

FRED J. HELD, JR.
ROBERT P. BLAINE.

REFERENCES CITED

The following references are of record in the file of this patent:

UNITED STATES PATENTS

| Number | Name | Date |
|---|---|---|
| 2,370,571 | Muskat et al. | Feb. 27, 1945 |
| 2,379,251 | Muskat et al. | June 26, 1945 |
| 2,385,932 | Muskat et al. | Oct. 2, 1945 |